Jan. 13, 1925.  
W. S. BEMIS  
HAND BRAKE FOR RAILWAY CARS  
Filed July 26, 1924  
1,522,608  
2 Sheets-Sheet 2

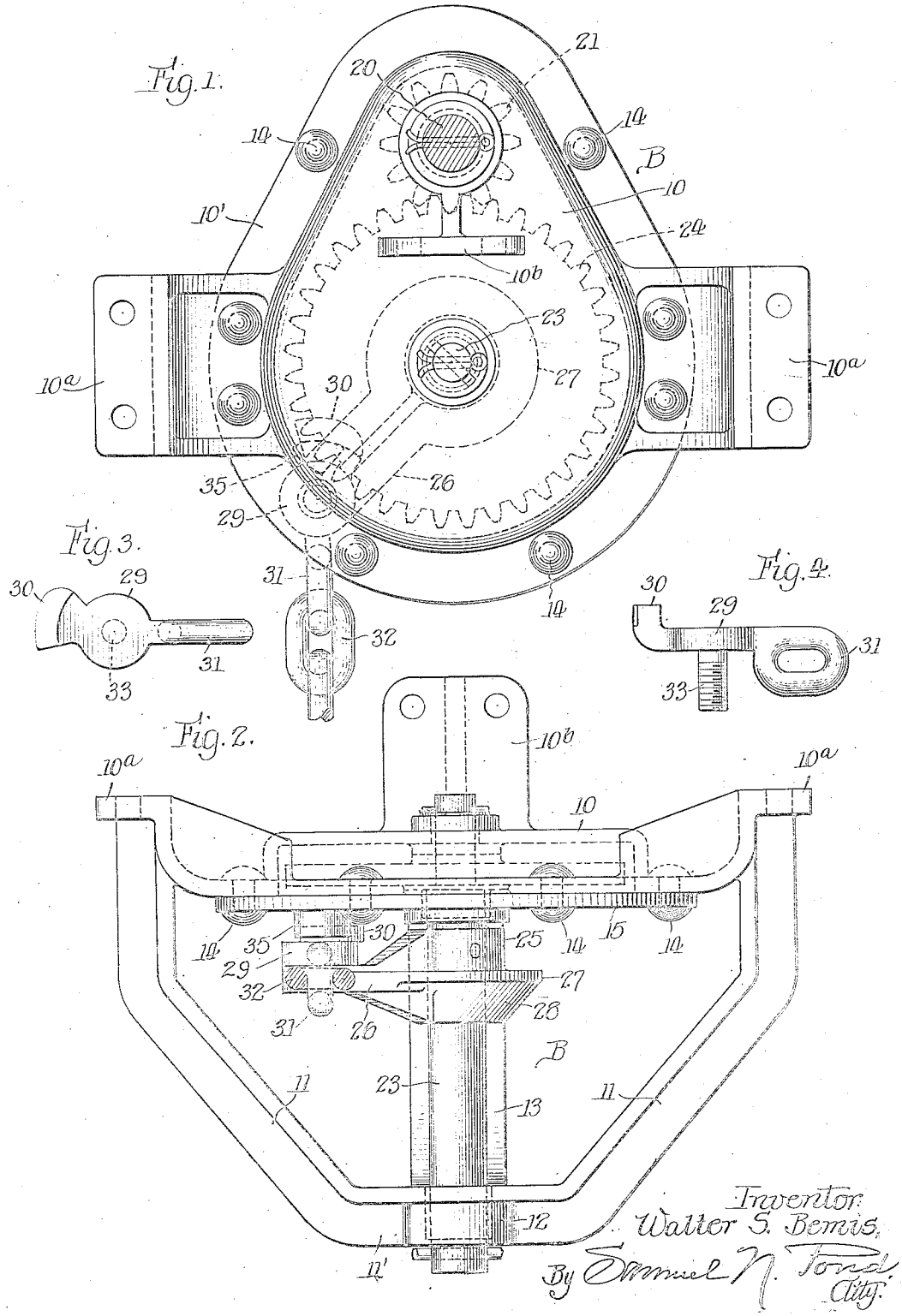

Inventor:  
Walter S. Bemis,  
By Samuel N. Pond  
Atty.

Patented Jan. 13, 1925.

1,522,608

UNITED STATES PATENT OFFICE.

WALTER S. BEMIS, OF CHICAGO, ILLINOIS.

HAND BRAKE FOR RAILWAY CARS.

Application filed July 26, 1924. Serial No. 728,332.

*To all whom it may concern:*

Be it known that I, WALTER S. BEMIS, a citizen of the United States, residing at Chicago, in the county of Cook and State of Illinois, have invented certain new and useful Improvements in Hand Brakes for Railway Cars, of which the following is a specification.

This invention relates to hand brakes for freight, trolley and other railway cars, and is applicable to brakes of both the direct and geared types, although it is especially advantageous as applied to the geared type.

It is common practice, in order to quickly pick up the slack in the brake chain, and begin the winding of the latter on the brake shaft or spiral or drum carried thereby, to attach the forward end of the brake chain to the free end of a radial arm fast on the brake shaft, so that the first half turn of the shaft draws the chain forward and lays it against the shaft or drum with a relatively accelerated movement. This half turn of the brake shaft however, precedes the actual application of the brakes to the wheels, and to that extent represents lost time, and in the case of the geared type it may represent the time required for several turns of the hand wheel. In emergencies this lost time may mean the difference between safety and a wreck, and hence any device by which the time and brake shaft movement required for taking the slack out of the brake chain and beginning the actual chain winding movement are lessened, represents an advantage and gain in the operation of hand brakes.

With this in view, the main object of my present invention is to provide a simple, efficient, reliable and inexpensive device, applicable to known and used types of hand brake mechanisms, which will permit the use of the radial arm on the brake shaft to effect a quick pick up of the slack in the chain and bring the latter into winding engagement with the shaft and at the same time will shorten the movement of the shaft and arm heretofore required to do this and consequently the time required for such movements.

With this object in view, my invention consists essentially of a fixed stop member, preferably on the shaft bracket, and a cooperating stop member carried by the radial arm and movable relatively to the latter under the pull of the chain to shift its path of travel relatively to the fixed stop member, so that in winding up the chain on the brake shaft the fixed stop member will present no interference with the winding operation, nor with the subsequent unwinding operation to release the brakes until during the last half turn of the brake shaft, when the chain swings free from the shaft, when the stop member carried by the arm will move to a position wherein it will strike and be arrested by the fixed stop member before the arm itself has swung all the way back to a position in line with the chain.

My invention, its manner of use and operation and the advantages inherent therein will be readily understood by persons skilled in the art from the following detailed description, taken in connection with the accompanying drawings, wherein I have illustrated one practical and approved embodiment of the invention, and in which:

Fig. 1 is a top plan view of a hand brake of the geared type having my improvement applied thereto, and showing the radial arm at the limit of its back turning movement;

Fig. 2 is a side elevation of the same, viewed from the bottom of Fig. 1;

Figs. 3 and 4 are top and side views respectively of a clevis that connects the brake chain to the radial arm and carries the movable stop member;

Figure 6:
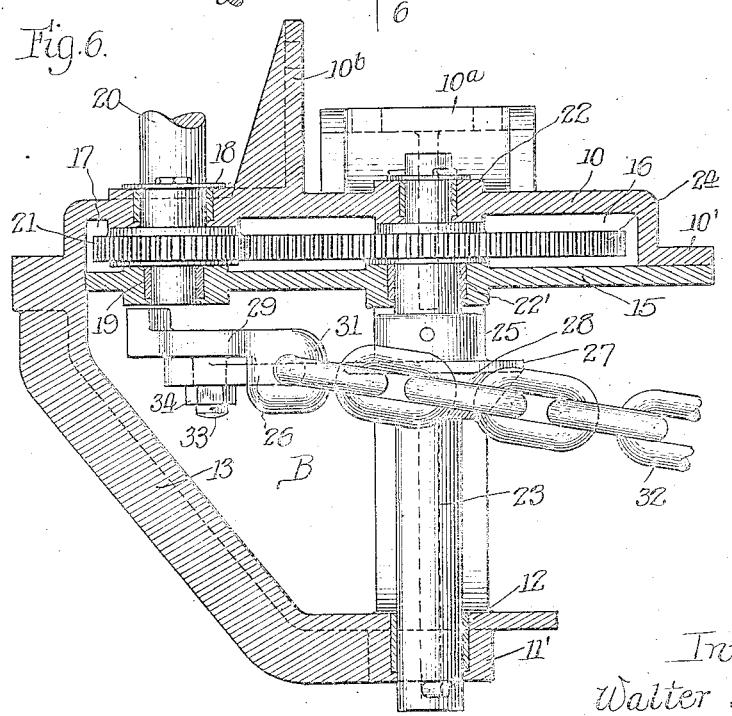
Fig. 6 is a section on the line 6—6 of Fig. 5 with the arm, chain and movable stop member appearing in side elevation in the foreground.

Referring to the drawings, B designates as an entirety the brake shaft bracket adapted to be attached to the under side and forward end of a car platform and support a brake shaft rigging of the geared type. With the specific structure of this bracket my present invention is not concerned, and any other known and approved form or type of bracket may be used. The bracket herein shown comprises a malleable casting having a top plate formed with a raised central portion 10, forming a gear cover and a marginal flange portion 10′ with oppositely disposed upwardly and outwardly extended wings 10ª, apertured for bolting to the underside of the platform (not shown) and an upstanding plate 10ᵇ apertured for bolting to the front end of the platform, a depending yoke 11 connecting the ends of the wings 10ª and formed with an intermediate horizontal portion 11' providing a bearing 12, for the lower end of the brake shaft, and a half-yoke or brace 13 connecting the forward narrow end of the top plate with the intermediate portion 11' of the yoke 11. Secured to and beneath the flange 10' of the top plate as by rivets 14, is a flat plate 15 which forms with the top plate gear and pinion chambers 16 and 17, respectively. (Fig. 6).

In bearings 18 and 19 of the top plate 10 and bottom plate 15, is mounted the usual hand wheel shaft 20 having on its lower end in chamber 17 a spur pinion 21.

In similar bearings 22 and 22' in the plates 10 and 15 respectively, and in the bearing 12, is journaled the gear shaft, 23, fast on which is the gear 24, meshing with and driven by pinion 21. Fast on the gear shaft 23 is the hub 25 of a radial arm 26, said hub preferably being formed with a flange 27, having a beveled lower face 28, by which the brake chain, during the winding operation, is guided and directed downwardly onto the lower portion of the shaft.

The outer end of the arm 26 is formed with a hole which receives the pivot post of a clevis. This clevis is best shown in the detail views Figs. 3 and 4, preferably comprising an arm 29 formed on one end with an upstanding stop member 30, and on its other end with a depending loop 31, to receive the brake chain 32. On the under side of the arm 29 is a vertical pivot post 33 which passes through the hole in the arm 26; said post being threaded to receive a nut 34.

On the under side of the plate 15 is a fixed stop member 35, preferably taking the form of an integral lug, to co-operate with the stop member 31 in arresting the return swing of the arm 26 during the final part of the unwinding operation, as hereinafter more particularly described.

Figure 5:
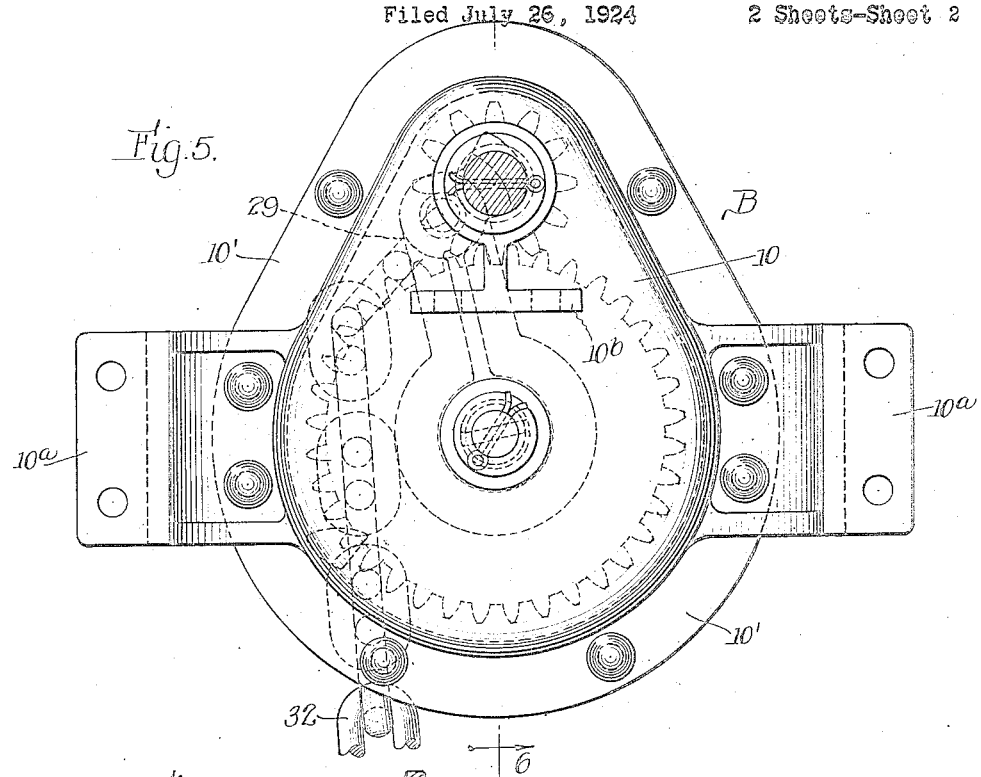
Fig. 5 is a view similar to Fig. 1, but showing the radial arm advanced to a position in which the chain is beginning to be wound on the shaft.

Describing the operation of the mechanism, Figs. 1 and 2 show the parts in the release position of the brakes. As the hand wheel shaft is turned, the brake shaft 23 is rotated in a clock-wise direction, viewing Figs. 1 and 5, and as the arm 26 moves from the position shown in Figure 1 to that shown in Fig. 5, the clevis 29 is swung relatively to the arm 26, to a position wherein the stop member 30 carried thereby lies at a greater distance from the axis of the brake shaft than does the fixed stop 35, so that its path of travel from the position shown in Fig. 5 to the fully wound position of the chain, and back to the position shown in Fig. 5, lies outside of the fixed stop 35. Consequently, the winding up and unwinding of the chain can be effected without any interference from the stop 35. During the final part of the unwinding operation, as the arm swings from the position shown in Fig. 5, toward that shown in Fig. 1, the clevis 29 undergoes, under the pull of the chain, a return swinging movement relative to the arm, which brings the movable stop member 30 back to a position in which it strikes and is arrested by the fixed stop 35, thus limiting the return swing of the arm 26 to the position shown in Fig. 1, which, in the instance shown, is approximately forty-five degrees short of the position which it would reach in the absence of such stop mechanism. This movement, however, is ample to provide sufficient slack in the brake chain, and brake rod to fully release the brakes. Hence, when applying the brakes, the extent of movement and time required to pick up the slack in the brake chain and lay the latter against the chain-winding portion of the brake shaft are considerably shortened; and this is accomplished without any interference with the regular and normal operation of the mechanism in applying and releasing the brakes.

I am aware that a device aiming at the same general object as my present invention has heretofore been proposed, the same consisting of co-operating lugs on the pinion and gear. My device is distinguished therefrom in that one of my stop members is fixed, or without movement, while the other is automatically shifted under the pull or drag of the brake chain between interfering and non-interfering positions relatively to the fixed stop member. While I have herein shown one practical and workable embodiment of the principle of my invention, it is manifest that the specific details herein shown and described may be considerably modified without departing from the principle of the invention or sacrificing any of the advantages thereof. Hence, I reserve all such variations and modifications as fall within the spirit and purview of the appended claims.

I claim.

1. In a hand brake for railway cars, the combination of a brake shaft bracket, a brake shaft mounted in said bracket, a radial arm on said shaft, a brake shaft chain connected to said arm, a fixed stop member, and a cooperating stop member carried by said arm and movable relatively to the latter under the pull of said chain to shift its path of travel relatively to said fixed stop member.

2. In a hand brake for railway cars, the combination of a brake shaft bracket, a brake shaft mounted in said bracket, a radial arm on said shaft, a brake shaft chain connected to the free end of said arm, a fixed stop member on said bracket, and a cooperating stop member carried by said arm, said last named stop member being shifted relatively to said arm by the pull of said chain when the latter is being wound on the brake shaft to a non-interfering position relatively to said fixed stop member and during the last part of the unwinding movement to an interfering position relatively to said fixed stop member.

3. In a hand brake for railway cars, the combination of a brake shaft bracket, a brake shaft mounted in said bracket, a radial arm on said shaft, a brake shaft chain connected to the free end of said arm, a fixed stop member on said bracket located on one side of the plane of travel of said arm, and a cooperating stop member pivotally mounted on said arm, said pivoted stop member being shifted relatively to said arm by the pull of said chain when the latter is being wound on the brake shaft to a non-interfering position relatively to said fixed stop member, and during the last part of the unwinding movement to an interfering position relatively to said fixed stop member.

4. In a hand brake for railway cars, the combination of a brake shaft bracket, a brake shaft mounted in said bracket, a radial arm on said shaft, a fixed stop member, a clevis pivoted on said arm and carrying a co-operating stop member, and a brake shaft chain connected to said clevis; said clevis being swung relatively to said arm by the pull of the chain as the latter is wound on the brake shaft, to a position wherein the stop member carried thereby clears said fixed stop member, and returned during the last part of the unwinding movement to a position wherein the stop member carried thereby strikes and is arrested by said fixed stop member.

5. In a hand brake for railway cars, the combination of a brake shaft bracket, a brake shaft mounted in said bracket, a radial arm on said shaft, a fixed stop member on said bracket located on one side of the plane of travel of said arm, a clevis swiveled intermediate its ends on said arm and formed with a cooperating stop member on one end thereof, and a brake shaft chain connected to the other end of said clevis; said clevis being swung relatively to said arm by the pull of the chain as the latter is wound on the brake shaft, to a position wherein the stop member carried thereby clears said fixed stop member, and returned during the last part of the unwinding movement to a position wherein the stop member carried thereby strikes and is arrested by said fixed stop member.

WALTER S. BEMIS.